(12) United States Patent
Fraser et al.

(10) Patent No.: US 12,281,027 B2
(45) Date of Patent: Apr. 22, 2025

(54) PROCESSES FOR CRYSTALLIZING METAL SULFATES AND METHODS FOR PRODUCING CRYSTALLIZED METAL SULFATES

(71) Applicant: HATCH LTD., Mississauga (CA)

(72) Inventors: Robert John Fraser, Oakville (CA); Andrea Winyen Trac, Delson (CA); Louiza Kahina Harkouk, St. Lazare (CA)

( * ) Notice: Subject to any disclaimer, the term of this patent is extended or adjusted under 35 U.S.C. 154(b) by 0 days.

(21) Appl. No.: 17/979,410

(22) Filed: Nov. 2, 2022

(65) Prior Publication Data
US 2023/0048939 A1    Feb. 16, 2023

Related U.S. Application Data

(63) Continuation of application No. PCT/CA2021/051614, filed on Nov. 12, 2021.
(Continued)

(51) Int. Cl.
C01G 53/10      (2006.01)
C01B 17/96      (2006.01)
(Continued)

(52) U.S. Cl.
CPC .............. C01G 53/10 (2013.01); C01B 17/96 (2013.01); C01G 1/10 (2013.01); C01G 3/10 (2013.01);
(Continued)

(58) Field of Classification Search
CPC ........ C01G 53/10; C01G 51/10; C01G 45/10; C22B 23/00; C22B 47/00; C30B 29/46; C01B 17/96
See application file for complete search history.

(56) References Cited

U.S. PATENT DOCUMENTS

3,656,937 A    4/1972 Gandon et al.
4,314,976 A    2/1982 Stewart et al.
(Continued)

FOREIGN PATENT DOCUMENTS

CA    3076688 A1    4/2019
CL    202300096 A1    7/2023
(Continued)

OTHER PUBLICATIONS

B.C. Tripathy et al., "Effect of Manganese (II) and Boric Acid on the Electrowinning of Cobalt from Acidic Sulfate Solutions", Metallurgical and Materials Transactions B, vol. 32B, Jun. 2001, 395-399.*
(Continued)

*Primary Examiner* — Wayne A Langel
(74) *Attorney, Agent, or Firm* — Borden Ladner Gervais LLP; Brandon Evenson (57) ABSTRACT

A process and method for producing a crystallized metal sulfate. The crystallized metal sulfate may be battery-grade. The method may comprise receiving a metal ion-containing stream and crystallizing a metal sulfate from the stream. The process may comprise receiving a stream from a metal processing plant, and crystallizing a metal sulfate from the stream. The process may be a metal electrowinning process comprising crystallizing a metal ion-containing stream to form a crystallized metal sulfate in a mother liquor. The process or method may comprise returning the mother liquor upstream or to the metal electrowinning process.

33 Claims, 6 Drawing Sheets

Related U.S. Application Data (60) Provisional application No. 63/112,891, filed on Nov. 12, 2020.

(51) Int. Cl.
    *C01G 1/10*     (2006.01)
    *C01G 3/10*     (2006.01)
    *C01G 45/10*     (2006.01)
    *C01G 51/10*     (2006.01)
    *C22B 23/00*     (2006.01)
    *C22B 47/00*     (2006.01)

(52) U.S. Cl.
    CPC ............. *C01G 45/10* (2013.01); *C01G 51/10* (2013.01); *C22B 23/00* (2013.01); *C22B 47/00* (2013.01)

(56) References Cited

U.S. PATENT DOCUMENTS

| | | | |
|---|---|---|---|
| 4,698,139 A | | 10/1987 | Fugleberg et al. |
| 10,995,014 B1 | * | 5/2021 | Fraser ............... C22B 7/007 |
| 2017/0077564 A1 | | 3/2017 | Wang et al. |
| 2018/0155208 A1 | | 6/2018 | Chow et al. |
| 2019/0152797 A1 | | 5/2019 | Liu et al. |
| 2023/0049318 A1 | * | 2/2023 | Fraser ............... C22B 47/0081 |

FOREIGN PATENT DOCUMENTS

| | | | |
|---|---|---|---|
| CL | 202301276 A1 | | 11/2023 |
| CN | 109 279 667 A | | 1/2019 |
| CN | 109626448 A | * | 4/2019 |
| CN | 109 734 107 A | | 5/2019 |
| CN | 110203975 A | * | 9/2019 |
| EP | 2784166 A1 | | 10/2014 |
| EP | 3670 686 A1 | | 6/2020 |
| JP | 2016056434 A | | 4/2016 |
| JP | 2017 149609 A | | 8/2017 |
| WO | 2002/09004 A1 | | 1/2002 |
| WO | 2019090389 A1 | | 5/2016 |
| WO | 2019/060996 A1 | | 4/2019 |
| WO | 2020/061639 A1 | | 9/2019 |
| WO | 2022009004 A1 | | 1/2022 |
| WO | 2022094706 A1 | | 5/2022 |

OTHER PUBLICATIONS

International Search Report and Written Opinion for International Application No. PCT/CA2021/051614, date of mailing Feb. 11, 2022.
Tusen-Ni, L. et al., "Chemical Reclaiming of Nickel Suflate from Nickel-Bearing Wastes", Conservation & Recycling, vol. 6, No. 1, pp. 55-62, Jan. 1, 1983.
Lu, J. et al., "Effects of Additives on Nickel Electrowinning from Sulfate System", Transactions of Nonferrous Metals Society of China, vol. 20, pp. s97-s101, May 1, 2010.
International Preliminary Report on Patentability for International Application No. PCT/CA2021/051614, date of mailing May 25, 2023.
Tusen-Ni, L. et al. "Chemical Reclaiming of Nickel Sulfate from Nickel-Bearing Wastes", Conservation & Recycling, 6(1), pp. 55-62, Jan. 1, 1983 (Jan. 1, 1983).
Lu, J.. et al. "Effects of Additives on Nickel Electrowinning from Sulfate System", Transactions of Nonferrous Metals Society of China, 20, pp. s97-s101, May 1, 2010 (May 1, 2010).
Cuban Office Action dated Aug. 11, 2023 for Application No. 2023-0022.
Russian Office Action and English Translation dated Nov. 20, 2023 for Application No. 202391263.
Yang, Yue et al.: "Stepwise recycling of valuable metals from Ni-rich cathode material of spent lithium-ion batteries", Waste Management, Elsevier, New York, NY, US, vol. 102, p. 131-138, XP085969166, ISSN: 0956-053X, DOI: 10.1016/J. Wasman.2019.09.044 (Oct. 31, 2019).
Nan, J. et al.: "Recovery of metal values from a mixture of spent lithium-ion batteries and nickel-metal hydride batteries". Hydrometallurgy, Elsevier Scientific Publishing CY. Amsterdam, NL, vol. 84, No. 1-2, pp. 75-80, XP027884170, ISSN: 0304-386X (Oct. 1, 2006).
Peter A. Gallerani, Plating & Surface Finishing, Jul./ Aug. 2009 issue, pp. 26-28 (Jul./Aug. 2009).
Chilean Patent Application No. 202301379, Office Action dated Nov. 7, 2024.

* cited by examiner

PROCESSES FOR CRYSTALLIZING METAL SULFATES AND METHODS FOR PRODUCING CRYSTALLIZED METAL SULFATES

This application claims priority to each of U.S. Provisional Application No. 63/112,891, filed Nov. 12, 2020, and PCT application PCT/CA2021/051614 filed Nov. 12, 2021; the contents of each of which is incorporated herein by reference in its entirety.

FIELD

The present disclosure relates to processes and methods for producing crystalized metal sulfates, including in connection with metal processing plants and electrowinning processes.

BACKGROUND

Crystallized metal sulfates are used in batteries, such as lithium ion batteries. For example, crystallized metal sulfates may be feedstocks used in the making of cathode materials that are used in lithium ion batteries. The demand for batteries has grown with continued technological advancements, such as the electrification of transportation and the desire to reduce the production of carbon dioxide from conventional energy sources. Processes and methods for producing crystallized metal sulfates are desirable, including processes and methods that integrate with or are used with metal processing plants.

BRIEF DESCRIPTION OF THE FIGURES

Embodiments of the present disclosure will now be described, by way of example only, with reference to the attached Figures.

DETAILED DESCRIPTION

Processes for producing crystallized metal sulfates are desirable. Furthermore, using such a process with existing plant processes, such as metal electrowinning, metal hydrogen reduction, metal intermediate production, or metal oxide production, could provide certain benefits. For example, one or more embodiments herein described provides an improvement for a nickel (Ni) electrowinning (EW) process that produces nickel metal. In one or more embodiments, a portion of the Ni-containing feed to Ni EW or the Ni-containing anolyte from Ni EW is treated using crystallization (along with other purification and/or impurities removal steps) to produce battery grade nickel sulfate. In one or more embodiments, some portion of water from the Ni-containing feed and anolyte will be removed during crystallization and will not be fed back to the process, thereby providing a method to control plant water balance and debottleneck the plant. This may help reduce the load on the nickel electrowinning plant by, for example, debottlenecking the plant and/or enabling additional production. The present disclosure is not limited to nickel electrowinning. In one or more embodiments, crystallized metal sulfate may be produced from feeds to, or processed streams from, for example, nickel electrowinning, cobalt electrowinning, and/or manganese electrowinning. In one or more embodiments, crystallized metal sulfate may be produced from feeds to, or processed streams from, for example, metal hydrogen reduction, metal intermediate production, and/or metal oxide production. In some embodiments the use of processed streams, for example, from metal electrowinning or metal intermediate production, may be suitable for producing crystallized metal sulfates. Processed streams that are depleted of metal ions, for example, from metal hydrogen reduction or metal oxide production, may not be suitable for producing crystallized metal sulfates. Any suitable metal ion-containing stream may be used in the methods and processes herein disclosed. Such methods and processes in accordance with the invention may help with, for example, diversification of products, providing an outlet for process water to control plant water balance, operating expense (OPEX) reduction of the plant, and/or debottlenecking the plant.

In an embodiment of the present disclosure there is provided a process for crystallizing a metal sulfate, the process comprising:
  receiving at least a portion of a stream from a metal processing plant, the stream comprising metal ions;
  providing a source of sulfate to form metal sulfate from the metal ions;
  crystallizing the metal sulfate to form a crystallized metal sulfate in a mother liquor;
  separating the crystallized metal sulfate from the mother liquor; and
  returning the mother liquor upstream in the process or returning the mother liquor to the metal processing plant.

In an embodiment of the present disclosure there is provided a process for metal electrowinning comprising crystalizing a metal ion-containing stream to form a crystallized metal sulfate in a mother liquor.

In an embodiment of the present disclosure there is provided a process for a metal processing plant, the process comprising: receiving at least a portion of a stream from the plant; and crystallizing a metal sulfate from the stream to form a crystallized metal sulfate in a mother liquor.

Providing a source of sulfate may comprise providing sulfate anions received from the stream. Providing a source of sulfate may comprise adding sulfuric acid. The process may further comprising returning the mother liquor to the plant. The process may further comprise refining the stream prior to crystallizing. The process may further comprise adding a source of sulfate to the stream. The process may further comprise adjusting the pH of the mother liquor. Adjusting the pH of the mother liquor may comprise basifying the mother liquor. The plant may be one or more of a metal electrowinning plant, a metal hydrogen reduction plant, a metal intermediate production plant, or a metal oxide production plant. Receiving at least the portion of the stream may comprise receiving the portion from a step of the plant. Returning the mother liquor may comprise returning the mother liquor to the same step or a different step of the plant. The stream may be a feed to a metal electrowinning, metal hydrogen reduction, metal intermediate production, or metal oxide production step of the plant. The stream may be an anolyte from a metal electrowinning step of the plant. The mother liquor may be returned upstream of the metal electrowinning, metal hydrogen reduction, metal intermediate production, or metal oxide production step of the plant. The mother liquor may be returned downstream of the metal electrowinning step of the plant. The stream may comprise nickel, cobalt, or manganese ions. The stream may comprise nickel ions. The crystallized metal sulfate may be a hydrated salt. The crystallized metal sulfate may be battery grade nickel sulfate. The stream may be a feed to metal electrowinning. The boric acid may be present in the stream or is added to the stream to suppress crystallization of sodium salts. The boric acid may be added only to the portion of the stream that is received for crystallization. Crystallizing the metal sulfate may comprise a first crystallization step and a second crystallization step, wherein the crystallized metal sulfate from the first crystallization step is redissolved and recrystallized in the second crystallization step. The mother liquor from the second crystallization step may be returned to either the first crystallization step or another step of the plant or process. The mother liquor may be a bleed stream used to preload an organic extractant in a solvent extraction step of the plant, with the metal sulfate to be recovered, to reduce a sodium, ammonium, or other impurity cation concentration in the stream in which the mother liquor is returned. Crystallizing the metal sulfate may further comprise treating the stream with sulfuric acid. The mother liquor may be acidic. Returning the mother liquor to the plant may comprise using the mother liquor upstream in the plant as a leaching agent.

In an embodiment of the present disclosure there is provided method for producing crystalized metal sulfate, the method comprising:
  receiving at least a portion of a metal ion-containing stream;
  crystallizing a metal sulfate from the stream to form a crystallized metal sulfate in a mother liquor; and
  returning the mother liquor as a bleed stream to a step in the method.

The method may comprise refining the stream prior to crystallizing. The method may further comprise adding a source of sulfate to the stream. The method may further comprise adjusting the pH of the mother liquor. Adjusting the pH of the mother liquor may comprise basifying the mother liquor. Returning the mother liquor may comprise returning the mother liquor to one or more steps in one or more of a metal electrowinning process, a metal hydrogen reduction process, a metal intermediate production process, or a metal oxide production process. Receiving at least a portion of the stream may comprise receiving the portion from a step in a metal electrowinning process, a metal hydrogen reduction process, a metal intermediate production process, or a metal oxide production process. Returning the mother liquor may comprise returning the mother liquor to the same step or a different step of the process. The stream may be an anolyte from a metal electrowinning process. The metal ion-containing stream may comprise nickel, cobalt, or manganese ions. The metal ion-containing stream may comprises nickel. Returning the mother liquor may comprise using the mother liquor as a leaching agent.

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or ingredient(s) as appropriate.

As used herein, "metal sulfate" may refer to any one of nickel sulfate, cobalt sulfate, and/or manganese sulfate. Further, "metal electrowinning" may refer to the electrowinning process that produces any one or a combination of nickel, cobalt, and/or manganese metal. "Metal hydrogen reduction" may refer to the process of nickel or cobalt hydrogen reduction. "Metal intermediate production" may refer to the process of mixed hydroxide production or cobalt hydroxide production. "Metal oxide production" may refer to the process of nickel oxide, cobalt oxide, and/or manganese oxide production where this may happen by an upstream hydrometallurgical route based primarily on sulphate chemistry.

As used herein, "crystallization", "crystallizing", or "crystallized" may refer to the process of forming a crystal network that is selectively formed from metal sulfates in a solution, resulting in a crystalline compound (as may be indicated by x-ray diffraction). In one or more embodiments of the processes or methods herein disclosed, crystallizing the uncrystallized metal sulfate comprises receiving a feed stream comprising uncrystallized metal sulfate in a crystallizer under conditions sufficient to selectively crystalize the uncrystallized metal sulfate. In one or more embodiments, the feed is pre-treated prior to crystallizing. In one or more embodiments, the feed is treated with sulfuric acid prior to crystallizing. In one or more embodiments, the feed is treated with sulfuric acid in an amount sufficient to promote crystallization of the desired metal sulfates. In one or more embodiments, the feed is treated with sulfuric acid in an amount sufficient to suppress crystallization of undesired products, such as sodium sulfate or other salts. In one or more embodiments, selectively crystallizing the uncrystallized metal sulfate may comprise selectively crystallizing any one or combination of $NiSO_4$, $CoSO_4$, and/or $MnSO_4$, out of solution (e.g., via a forced circulation crystallizer under vacuum, etc., against sodium, lithium, manganese depending on the feed material) to produce crystallized metal sulfates in a mother liquor. These crystallized metal sulfates may then be discharged from the crystallizer, thus isolating them from the mother liquor. If one crystallization cycle (e.g., using one crystallizer) is insufficient to produce crystallized metal sulfates (which may occur with dirtier feed materials, for example), the crystals discharged from the crystallizer may be dissolved in pure or recycled water before introduction to a second crystallization cycle (e.g., using a second crystallizer) to be recrystallized. After crystallization, the mother liquor may still contain undesired salts/metals (e.g., Mg, Na, calcium, K, borates etc.), as well as remaining, uncrystallized metal sulfate and/or additional solubilized metal ions. To selectively recover the remaining uncrystallized metal sulfates from the remaining undesired materials in solution, the mother liquor may be 'bled' from the crystallizer. The bleed stream from the crystallizer may be used up-stream in the plant, such as a metal electrowinning, metal hydrogen reduction, metal intermediate production, or metal oxide production plant. The bleed stream may be returned upstream of the metal electrowinning, metal hydrogen reduction, metal intermediate production, or metal oxide production step in the plant's process. Different types of crystallizers may be suitable for affecting the selective crystallization of the uncrystallized metal sulfate from the feed solution. Such crystallizers include, but are not limited to, evaporative crystallizers, forced circulation (FC) crystallizers, indirect force circulation (IFC) crystallizers, and draft tube baffle (DTB) crystallizers. The conditions and operational parameters for such crystallizers can be selected depending on the type and purity of metal sulfate to be crystallized, and/or the type and concentration of impurities in the feed solution.

As used herein, "stream" refers to the fluid input or output from any step in a processing plant. The terms "feed" and "processed stream" may be used interchangeably with "stream", where "feed" more specifically refers to the input of a step in a processing plant, and "processed stream" more specifically refers to the output of a step in a processing plant. The terms "mother liquor" and "bleed stream" may be used interchangeably herein, to describe the leftover liquid from the crystallization process. In one or more embodiments of the processes or methods herein disclosed, the stream or feed may be an intermediate feedstock. Intermediate feedstocks are feedstocks that have been pre-processed from original, or raw feedstocks. Intermediate feedstocks may comprise lower concentrations of impurities following the pre-processing than the original, raw feedstocks. In one or more embodiments, the stream or feed comprises, in addition to impurities such as sodium, calcium, magnesium, potassium, and/or borates, metals desirable in the production of materials for batteries, such as cobalt, manganese, and/or nickel. Any suitable metal ion-containing stream may be used for the method or process herein described. The stream may be at least a portion of the feed stream to a metal electrowinning, metal hydrogen reduction, metal intermediate production (or precipitation), or metal oxide production step in a process. The stream may be at least a portion of the processed stream from metal electrowinning or metal intermediate production.

As used herein, a "process", "treatment process", or "treating" may refer to a process or a step in a processing plant. A step in a processing plant may further comprise a pre-treatment step, an impurity removal step, or a combination of both. A "step" in a processing plant may include, but is not limited to any one or a combination of: mechanical processing (e.g. grinding or crushing); leaching; residue separation; impurities removal; solvent extraction; metal electrowinning; metal hydrogen reduction; metal intermediate production; metal oxide production; treatment with a reagent (e.g. acidification, basification, or neutralization); or other physical processing (e.g. crystallization, evaporation, centrifugation, dissolution, filtering, or purifying).

As used herein, an "impurity" refers to a component of a feedstock that is not a metal sulfate as described herein, or does not contribute to formation of a metal sulfate or crystallized metal sulfate as described herein. As used herein, an 'impurity', once isolated from a feedstock, may be a useful, valuable, or desirable material. Furthermore, a metal sulfate itself may be an "impurity" in a different metal sulfate. For example, manganese and/or cobalt sulfate may be considered, in one or more embodiments, to be an impurity in a crystallized nickel sulfate, etc.

In accordance with an embodiment of the present disclosure a method and process, or a method and process for a plant is provided. The method and process comprises: receiving at least a portion of a stream, such as from a step of the plant; crystallizing a metal sulfate from the stream to form a crystallized metal sulfate in a mother liquor; and returning the mother liquor, such as to the same step or a different step of the plant. The plant may be a metal electrowinning plant, a metal hydrogen reduction plant, a metal intermediate production plant, or a metal oxide production plant.

In one aspect, the present disclosure provides a process for crystallizing metal sulfate, the process comprising: receiving at least a portion of a stream from a metal processing plant, the stream comprising metal ions; providing or adding a source of sulfate to the stream to form metal sulfate; crystallizing the metal sulfate from the stream to form a crystallized metal sulfate in a mother liquor; separating the crystallized metal sulfate from the mother liquor; and returning the mother liquor upstream in the process or returning the mother liquor to the metal processing plant.

In one aspect, the present disclosure provides a method for producing a crystalized metal sulfate with a processing plant, the method comprising: receiving at least a portion of a stream from a step in the processing plant; crystallizing a metal sulfate from the stream to form a crystallized metal sulfate in a mother liquor; and returning the mother liquor as a bleed stream to the same step or a different step in the processing plant, wherein the processing plant is a metal electrowinning plant, a metal hydrogen reduction plant, a metal intermediate production plant, or a metal oxide production plant.

In one aspect, the present disclosure provides a process for a metal electrowinning plant, a metal hydrogen reduction plant, a metal intermediate production plant, or a metal oxide production plant, the process comprising: receiving at least a portion of a feed stream from the metal electrowinning, metal hydrogen reduction, metal intermediate production, or metal oxide production plant; crystallizing a metal sulfate from the feed stream to form a crystallized metal sulfate in a mother liquor; and returning the mother liquor to the plant. In one aspect, the present disclosure provides a process for a metal electrowinning plant, the process comprising: receiving at least a portion of anolyte from the metal electrowinning plant; crystallizing a metal sulfate from the stream to form a crystallized metal sulfate in a mother liquor; and returning the mother liquor to the metal electrowinning plant or upstream processes. In one aspect, the present disclosure provides a process for crystallizing a metal sulfate, the process comprising receiving a metal-containing feed as a side-stream from a metal electrowinning, metal hydrogen reduction, metal intermediate production, or metal oxide production plant; crystallizing a metal sulfate from metal-containing feed to form a crystallized metal sulfate in a mother liquor; and providing the mother liquor as a bleed stream to the plant. In an embodiment, a process for metal electrowinning is provided, the process comprising crystalizing a metal ion-containing stream to form a crystallized metal sulfate in a mother liquor.

Receiving a Stream

In one or more embodiments, the present disclosure provides a process for a metal processing plant comprising: receiving at least a portion of a stream from the plant; and crystalizing a metal sulfate from the stream to form a crystallized metal sulfate in a mother liquor. In one or more embodiments, the metal processing plant may be a plant for nickel electrowinning. In one or more embodiments, crystallized metal sulfate may be produced from feeds to, or processed streams from, for example, nickel electrowinning, cobalt electrowinning, and/or manganese electrowinning. In one or more embodiments, crystallized metal sulfate may be produced from feeds to, or processed streams from, for example, metal hydrogen reduction, metal intermediate production, and/or metal oxide production.

In one or more embodiments, the process or method herein disclosed may be for use with an existing plant, or may be integrated into a newly designed plant. The stream from the plant may be transferred directly to the process or method, or the stream may be stored, transported, or refined prior to being received in the process or method.

The stream or a portion thereof may be received from a step of the plant. The stream may be a feed to a metal electrowinning, metal hydrogen reduction, metal intermediate production, or metal oxide production step of the plant. The stream may be an anolyte from a metal electrowinning step of the plant.

In some embodiments the use of processed streams, for example, from metal electrowinning or metal intermediate production, may be suitable for producing crystallized metal sulfates. Processed streams that are depleted of metal ions, for example, from metal hydrogen reduction or metal oxide production, may not be suitable for producing crystallized metal sulfates. Any suitable metal ion-containing stream may be used in the methods and processes herein disclosed.

The stream may comprise nickel, cobalt, or manganese ions. The stream may be an aqueous solution comprising metal sulfate. The stream may be received and crystallized without further processing, or the stream may be refined by one or more refining steps.

In one or more embodiments, boric acid may be added to the stream. Boric acid may be added to suppress the crystallization of sodium salts. Boric acid may be added only to the portion of the stream that is received for crystallization. In one or more embodiments, boric acid may already be present in the stream. For example, boric acid may be an additive that benefits nickel electrowinning, and may be present in a stream of nickel-containing anolyte from nickel electrowinning.

In one or more embodiments, crystallizing the metal sulfate further comprises treating the stream with sulfuric acid. The method or process may include treating the stream with sulfuric acid in the crystallization step, or in a refining step. If the stream comprises metal sulfate, sulfuric acid may or may not be added to the stream. If the stream comprises metal ions, sulfuric acid or another source of sulfate may be added to the stream.

Refining

In one or more embodiments, the process or method as described herein further comprises optionally refining the stream prior to crystallizing. Refining may include refining the aqueous solution comprising the metal sulfate (e.g., the stream from the plant), where the stream is subjected to any one or combination of refining stages (also referred to herein as impurity or component removal stages) to remove specific impurities or components such as: Cu (e.g., via sulfiding, solvent extraction, cementation, ion exchange, etc.), Fe and Al (e.g., via precipitation, ion exchange, etc.), Zn (e.g., via sulfiding, solvent extraction, ion exchange, etc.), Co (e.g. via solvent extraction, ion exchange, precipitation etc.), Ca (e.g. via solvent extraction, ion exchange, etc.), Mg (e.g. via solvent extraction, ion exchange etc.), or F (e.g. via calcium/lime addition). The type and amount of impurities or components to be removed is dependent, at least in part, on the type of feedstock from which the stream is formed, as well as the specifications for the final product generated by the process.

Examples of impurities or components to be removed include, but are not limited to, sodium (Na), aluminum (Al), iron (Fe), copper (Cu), zinc (Zn), lithium (Li), nickel (Ni), cobalt (Co), and manganese (Mn). Components that may need to be removed may include any one or two of nickel, cobalt, and manganese, such that only one or two of crystallized nickel sulfate ($NiSO_4$), cobalt sulfate ($CoSO_4$), and manganese sulfate ($MnSO_4$) are isolated from the crystallizer; e.g., for use as a final product, such as battery-grade metal sulfate(s). Otherwise, all three of nickel sulfate ($NiSO_4$), cobalt sulfate ($CoSO_4$), and manganese sulfate ($MnSO_4$) are isolated from the crystallizer. When battery-grade metal sulfates are required, there are specific product specifications (e.g., limits) for such impurities that are tolerated for, e.g., battery-grade nickel sulfate; and any such impurities that are present in a process' feedstock, water, or reagents in an amount that exceeds said product specification would need to have their concentration reduced.

There are many suitable methods for removing impurities or components from the stream. Such methods include, but are not limited to precipitation, atmospheric or pressure leaching, sulfidation, solvent extraction, ion exchange, and cementation. Selecting the appropriate method (and operational conditions thereof) depends, at least in part, on the type and amount of impurities or components to be removed, as well as the specifications for the final product generated by the process. For example, copper may be removed via precipitation, solvent extraction, sulfidation, cementation, or ion exchange, etc.; iron and aluminum may be removed via precipitation, or ion exchange, etc.; zinc may be removed via sulfidation, solvent extraction, or ion exchange, etc.; and cobalt and/or manganese may be removed via solvent extraction, ion exchange, or oxidative precipitation etc. The conditions and operational parameters for each method are generally known and can be selected depending on the type and amount of impurity or component to be removed.

For example, cementation is a process involving a redox reaction between a first metal ion and a first solid metal, whereby the first metal ion is reduced to a second solid metal by the first, and the first solid metal is in turn oxidized to a second metal ion. Cementation may be selected for removing, e.g., copper because it can add value metals to the process (for example, by adding Ni if nickel powder is used as the first solid metal) without the use of other reagents; and/or because it can allow removal of impurities (for example, by reduction) without having to add acid or base reagents to the process.

The refining stages for removing impurities or components from the stream may be selected to minimize use of acid or base reagents. For example, Cu can be removed via cementation with nickel powder, which requires little acid and no base, and generates no acid; in contrast, removal of Cu by solvent extraction (SX) requires one mole of sulphuric acid per mole of Cu removed, and all of said added acid needs to be neutralized by a base downstream. Other impurities such as Fe and Al can be removed via precipitation by raising the pH (e.g., to about 5.5), which requires added base but no added acid; base which can be introduced as an external neutralizing agent, or as a basic metal salt generated downstream in the process. In contrast, removal of Fe and Al by ion exchange (IX) requires added base to load the Fe and Al onto the exchange column, and it also requires added acid to strip the Fe and Al off the exchange column, and additional reagents or process steps to convert those impurities to a disposable form.

In one or more embodiments of the present disclosure, there is provided a treatment process wherein the stream comprising an uncrystallized metal sulfate further comprises a second portion of the calcium and/or magnesium impurities from the feedstock, and the refining comprises adding a fluoride source to the stream, selectively reacting the fluoride source with the second portion of the calcium and/or magnesium impurities and forming calcium and/or magnesium fluoride compounds, and precipitating the calcium and/or magnesium fluoride compounds from the leached solution.

In one or more embodiments of the present disclosure, there is provided a treatment process wherein the stream comprising an uncrystallized metal sulfate further comprises a second portion of the calcium and/or magnesium impurities from the feedstock, and the refining comprises a solvent extraction step that selectively extracts at least the second portion of the calcium and/or magnesium impurities from the stream solution onto, or into a solvent extraction reagent. In one or more embodiments, the solvent extraction step further comprises scrubbing the calcium and/or magnesium impurities from the solvent extraction reagent.

Crystallization/Co-Crystallization

The processes and methods described herein comprise crystallizing a metal sulfate from a stream from a plant to form a crystallized metal sulfate.

The stream or optionally refined stream is introduced into a crystallizer under conditions sufficient to selectively crystalize or co-crystallize any one or combination of nickel sulfate, cobalt sulfate, and/or manganese sulfate from solution. Such selective crystallization occurs against components such as ammonium, lithium, sodium, potassium, magnesium, that remain in the stream (depending on the feedstock) to provide one or more crystallized metal sulfates (e.g., nickel, manganese, and/or cobalt sulfates) in a mother liquor.

Different types of crystallizers may be suitable for affecting the selective crystallization or co-crystallization of nickel, manganese, and/or cobalt sulfates. Such crystallizers include, but are not limited to, evaporative crystallizers, forced circulation (FC) crystallizers, indirect force circulation (IFC) crystallizers, and draft tube baffle (DTB) crystallizers. The conditions and operational parameters for such crystallizers can be selected depending on the type and purity of metal sulfate to be crystallized, and/or the type and concentration of impurities in the stream. For example, if an IFC or DTB crystallizer is used, coarser crystals may be formed when crystallizing metal sulfates; this can inhibit the entrainment of impurities during said crystallization, such as lithium, sodium magnesium, and/or potassium. If a forced circulation crystallizer is used, it may be operated under vacuum in order to flash cool the stream to ambient temperatures (e.g., about 25° C.), which in turn can facilitate water evaporation and metal sulfate crystallization. In such cases, the amount of free water being evaporated may be less than the amount necessary to reach a saturation point of certain impurities, such as lithium or sodium. When a crystallizer is used to selectively crystallize nickel sulfate, cobalt sulfate, and manganese sulfate together against impurities such as lithium and sodium, the crystallizer may be operated at a pH level between 1-5, or between 1.5-2.5. In some embodiments, a pH level less than 0, less than 1.5, or between 0.5-1.5 is effective.

Further, the conditions and operational parameters of the crystallizer may be selected to selectively crystallize one metal sulfate, or combination of metal sulfates, over other sulfates and components (e.g., impurities) in solution. For example, when the concentration of one or two metal sulfates are at a very low concentration in the stream, and a third metal sulfate is at a much higher concentration, careful selection of the crystallizer bleed rate (e.g., a sufficiently high bleed rate) can allow for selective crystallization of the third metal sulfate over the one or two metal sulfates.

The conditions and operational parameters for the crystallizer may also be selected to manage the purity of the crystallized metal sulfates. Bleeding the mother liquor from the crystallizer during crystallization, and the rates at which the bleeding occurs, can impact the purity of the crystallized metal sulfates; for example, by selectively inhibiting crystallization of impurities. As used herein, selecting a bleed rate to selectively inhibit crystallization of a specific impurity means to set a crystallizer bleed rate, within a range of possible bleed rates that inhibits the crystallization of the specific impurity more so than it would inhibit crystallization of a different impurity. The bleed rate may be selected such that it maximizes inhibiting crystallization of the specific impurity. The impurities may be sodium, potassium, magnesium, etc. Using a higher bleed rate of the mother liquor helps to maintain lower concentrations of impurities and other components in the mother liquor that could impact the purity of the crystallized metal sulfates. In one example, if the optionally refined stream is of lower purity, for instance 10 due to a 30% increase in a primary feedstock impurity, this results in a lower metal sulfate crystallization single pass yield on the order of 5 to 10% and a higher overall mother liquor bleed.

Further, impurity solubility can be temperature dependent; therefore, selecting the crystallizer temperatures as well as the crystallizer bleed rates can be effective in managing the purity of the metal sulfate(s) being crystallized. For example, lithium sulfate solubility decreases with increasing temperature, so if the crystallizer is operated at higher temperatures, any lithium sulfate remaining in the stream may precipitate out and impact the purity of the crystallized metal sulfates. However, if the crystallizer is operated at lower temperatures, the lithium sulfate may remain in solution; and, increasing the crystallizer bleed rate may remove the lithium sulfate from the crystallizer and prevent it from coming out of solution with the crystallizing metal sulfate(s). Alternatively, if the crystallizer is operated under different temperature conditions while maintaining the same bleed rate, different levels of lithium contaminations may be obtained. In contrast, the solubility of sodium increases with increasing temperatures. As such, if the crystallizer is operated at higher temperatures, the sodium may remain in solution; and increasing the crystallizer bleed rate may remove the sodium from the crystallizer before it can come out of solution with the crystallizing metal sulfates. However, if the crystallizer is operated at lower temperatures, the sodium remaining in the mother liquor may precipitate, due to its lower solubility, or may react with nickel to form double salts that can impact the purity of the crystallized metal sulfates.

Impurity solubility can also be dependent on the amount of free water present in the stream and/or mother liquor; therefore, managing water levels in the crystallizer can be an effective means of managing the purity of the metal sulfate (s) being crystallized. For example, in some instances, the metal sulfates crystallize out of solution as metal-sulfate hydrates (i.e., crystallized metal sulfates and water molecules combined in a definite ratio as an integral part of the crystal), which reduces the concentration of water in the mother liquor. By decreasing the concentration of free water, the concentration of impurities (e.g. lithium, sodium, potassium, magnesium, etc.) in the mother liquor may also increase to the point that they crystallize out of solution and impact the purity of the crystallized metal sulfates. However, if a sufficient amount of water is added to the stream and/or mother liquor when in the crystallizer, or if that amount of excess water remains in the stream after upstream treatment (e.g., at least as much water as is expected to be lost due to hydrate formation), the presence of that free water can inhibit the crystallization of impurities out of solution.

The crystallized metal sulfates may be isolated from the mother liquor by discharging them from the crystallizer. For example, the crystallized metal sulfates may be discharged as a slurry that is passed to a filter or centrifuge to separate the crystals from the mother liquor. The filtrate or centrate (i.e., mother liquor) may then be passed back to the crystallizer, or a fraction of it may be bled; and the isolated crystals may be washed on the filter or centrifuged and dried. In some instances, using only one crystallizer is insufficient to produce suitably pure, crystallized metal sulfates, such as when the stream is formed from dirtier feedstocks. Crystals discharged from a first crystallizer may then be dissolved in water (e.g., pure or recycled water) before being introduced into a second crystallizer to be recrystallized and further purified.

The process may produce any one or combination of crystalized nickel sulfate ($NiSO_4$), cobalt sulfate ($CoSO_4$), and manganese sulfate ($MnSO_4$). The process may produce any one or two of crystalized nickel sulfate ($NiSO_4$), cobalt sulfate ($Co-SO_4$), and manganese sulfate ($MnSO_4$). The process may produce all three of crystalized nickel sulfate ($NiSO_4$), cobalt sulfate ($CoSO_4$), and manganese sulfate ($MnSO_4$). Of the crystallized metal sulfates isolated from the process, some may be battery-grade. Of the crystallized metal sulfates isolated from the process, some may be suitable for use in electroplating. Of the crystallized metal sulfates isolated from the process, some may be metal sulfate hydrates (e.g., crystallized metal sulfates and water molecules combined in a variety of ratios as an integral part of the crystal; for example, a ratio of one water molecule per metal sulfate, or six water molecules per metal sulfate, or seven water molecules per metal sulfate).

In one or more embodiments of the present disclosure, crystallizing the metal sulfate further comprises bleeding the mother liquor and controlling the bleed rate from a crystallizer to selectively inhibit crystallizing an impurity when crystallizing the metal sulfate. In one or more embodiments, crystallizing the metal sulfate further comprises controlling an amount of free water in a crystallizer, by one or more of controlling the rate of water evaporation from the crystallizer, and controlling the addition of water to the crystallizer, to selectively inhibit crystallizing an impurity when crystallizing the metal sulfate.

In one or more embodiments of the present disclosure, crystallizing the metal sulfate comprises selectively crystallizing any one or two of the nickel sulfate, manganese sulfate, and cobalt sulfate from the aqueous solution. In one or more embodiments of the process described herein, crystallizing the metal sulfate comprises selectively crystallizing any combination of the nickel sulfate, manganese sulfate, and cobalt sulfate from the aqueous solution. In one or more embodiments of the process described herein, the crystallized metal sulfate is a battery-grade crystallized metal sulfate, or an electroplating-grade crystallized metal sulfate.

In one or more embodiments, the stream comprises metal ions. If the stream does not contain sufficient sulfate to crystalize metal sulfate, then a source of sulfate may be added to the stream. A source of sulfate may be added to the stream in a refining step or in the crystallizing step. In one or more embodiments, the source of sulfate is sulfuric acid. In one or more embodiments, sulfuric acid may be added to the stream or to the crystallizer for any suitable purpose, such as to favour the crystallization of one metal sulfate over another. For example, sulfuric acid may be added to favour nickel sulfate crystallization over sodium sulfate crystallization.

Recycling

In one or more embodiments, the processes and methods disclosed herein may comprise returning the mother liquor to the plant. The plant may be one or more of a metal electrowinning plant, a metal hydrogen reduction plant, a metal intermediate production plant, or a metal oxide production plant. When a stream is received to the process or method from a given step of the plant, returning the mother liquor may include returning the mother liquor to the same step or a different step of the plant. The mother liquor may be returned upstream of a metal electrowinning, metal hydrogen reduction, metal intermediate production, or metal oxide production step of the plant. The mother liquor may be returned downstream of a metal electrowinning, metal hydrogen reduction, metal intermediate production, or metal oxide production step of the plant.

In one or more embodiments, the processes and methods disclosed herein may comprise crystallizing the metal sulfate in a first crystallization step and a second crystallization step. The crystallized metal sulfate from the first crystallization step may be redissolved and recrystallized in the second crystallization step. The mother liquor from the first crystallization step and/or the second crystallization step may be recycled, or returned to either the first crystallization step or another step of the plant or process.

In one or more embodiments, the mother liquor may be a bleed stream used to preload an organic extractant in a solvent extraction step of the plant, with the metal sulfate to be recovered, to reduce a sodium, ammonium, or other impurity cation concentration in the stream in which the mother liquor is returned.

Figure 7:
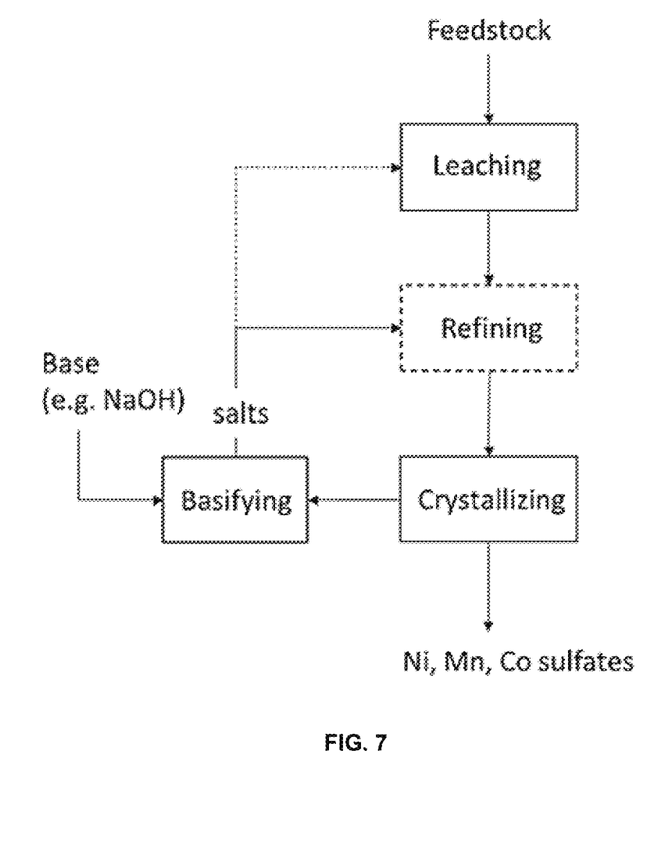
FIG. 7 depicts a flow diagram of a general process for generating crystallized metal sulfates.

In one or more embodiments, the mother liquor may be acidic. The acidic mother liquor may be returned to the plant. The acidic mother liquor may be used as a bleed stream, and the bleed stream may be used upstream in the plant as a leaching agent. In one or more embodiments, the pH of the mother liquor may be adjusted. In one or more embodiments, the mother liquor may be basified, for example, as demonstrated in FIG. 7. The basified mother liquor may be used upstream in the process or returned to the plant. The mother liquor, whether acidic, neutralized, or basified, may be used or disposed of in any suitable manner without departing from the spirit of the present disclosure.

Process for Generating a Metal Sulfate

In one or more embodiments of the present disclosure, the process or method described herein provides the selective crystallization or co-crystallization of any one or combination of nickel sulfate ($NiSO_4$), cobalt sulfate ($CoSO_4$), and manganese sulfate ($MnSO_4$). In one or more embodiments, the process described herein provides the selective crystallization or co-crystallization of one or two of crystalized nickel sulfate ($NiSO_4$), cobalt sulfate ($CoSO_4$), and manganese sulfate ($MnSO_4$). In one or more embodiments, the process described herein provides the selective co-crystallization of all three of crystalized nickel sulfate ($NiSO_4$), cobalt sulfate ($CoSO_4$), and manganese sulfate ($MnSO_4$). In one or more embodiments, the process described herein provides battery-grade, crystallized metal sulfates. In one or more embodiments, the process provides electroplating-grade, crystallized metal sulfates. In one or more embodiments, the process described herein does not use solvent extraction circuits to isolate battery-grade, crystallized metal sulfates. In one or more embodiments, the process described herein reduces capital and operating costs; increases yield of crystallized metal sulfates; and/or reduces or eliminates sodium sulfate as a solid waste (when sodium hydroxide is used as an external neutralizing agent, and the sodium sulfate is converted back to sodium hydroxide via electrolysis, or where the amount of external neutralising agent required is reduced).

In some embodiments, the process or method described herein reduces capital and operating costs because it uses a crystallizer to isolate crystallized metal sulfates, in place of solvent extraction circuits. While crystallization requires energy input, it does not require use of added reagents, thereby reducing operating costs. Further, the capital costs associated with crystallization are lower than those associated with solvent extraction circuits.

In other embodiments, the process or method described herein reduces capital and operating costs by reducing reagent use. For example, a nickel solvent extraction circuit to form nickel sulfate requires the consumption of 1 mole of sulfuric acid and 2 moles of sodium hydroxide per mole of nickel sulfate produced. In contrast, crystallization does not require the use of any added reagents. The process described herein can reduce reagent use even if a solvent extraction step is used as part of the refining stage, as said solvent extraction will generally experience a smaller load (i.e., impurities at lower concentrations), and so will require less acid and base. In some embodiments, the process described herein reduces capital and operating costs by reducing the number of processing steps. Reducing the number of process steps not only reduces capital and operating costs, it also reduces the complexity of the process, and therefore reduces the complexity of the infrastructure and skillsets needed to conduct the process. For example, solvent extraction is a relatively complex unit operation requiring multiple stages of extraction, scrubbing, and stripping; and requiring systems for treatment of aqueous discharge streams, crud removal, organic vapor recovery, and fire protection. By using a crystallizer to isolate crystallized metal sulfates, in place of solvent extraction circuits, such process complexity (and associated costs) can be avoided.

In other embodiments, the process or method described herein increases yield of crystallized metal sulfates by reducing or preventing the addition of specific impurities or components in the refining stages of the process or upstream steps in the plant, such as sodium, potassium, or magnesium. For example, as the one-pass yield of crystallized metal sulfates increases in the crystallizer, the concentrations of impurities such as sodium, etc. in the mother liquor also increases. As a result, the crystallizer bleed rate must also increase to manage the purity of the crystallized metal sulfates (for example, by inhibiting or preventing the impurities from approaching their saturation concentrations in the mother liquor). However, increasing the crystallizer bleed rate may create inefficiency, as the bled uncrystallised metal sulfates will be basified and precipitated, consuming reagents. As such, reducing or preventing the addition of these impurities in the leaching and/or refining stages of the process means the crystallizer can be operated at a lower bleed rate while avoiding co-crystallization of impurities with the metal sulfates, which can improve the one-pass yield of crystallized metal sulfates while also decreasing operational costs. In one or more embodiments of the process of the present disclosure, the addition of specific impurities (e.g., sodium, magnesium, etc.) is reduced or prevented by using the basic metal salts (e.g., the metal hydroxides $Ni(OH)_2$, $Co(OH)_2$, $Mn(OH)_2$, etc.) precipitated from the mother liquor that is bled from the crystallizer and basified. In some embodiments, precipitation and washing of the basic metal salts is carefully controlled (e.g., by selection of pH levels, use of two-stage precipitation circuits, etc.) to reduce or prevent precipitating impurities (e.g., lithium, sodium, magnesium, etc.) into the basic metal salts.

In some embodiments, the process or method described herein increases yield of crystallized metal sulfates by using a loop of isolating and recycling crystallization mother liquors. The iterative nature of the loop ensures a very good recovery of crystallized metal sulfates.

In some embodiments, the process or method described herein reduces capital or operating costs because it generates metal sulfate products from streams containing metal ions. The metal sulfates may be battery-grade, and may be an additional and valuable product to an existing metal processing plant.

To gain a better understanding of the invention described herein, the following examples are set forth. It should be understood that these examples are for illustrative purposes only. Therefore, they should not limit the scope of this disclosure in anyway.

EXAMPLES

Example 1

Treating a Ni-Containing Feed to Ni EW

Figure 1:
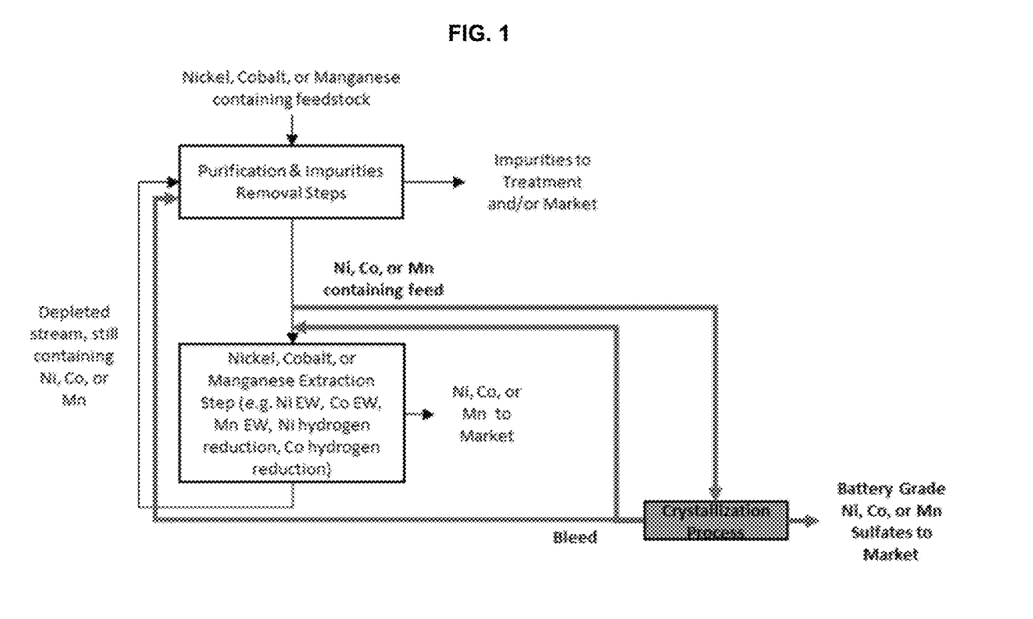
FIG. 1 is a schematic diagram of a process for producing crystalized metal sulfates according to an embodiment of the present disclosure, where the process comprises receiving a metal ion-containing feed of a metal electrowinning (EW) or hydrogen reduction process.

For a nickel electrowinning (Ni EW) process that produces nickel metal, a portion of the Ni-containing feed destined to Ni EW can be treated using crystallization (along with other purification/impurity removal steps) to produce battery grade nickel sulfate (see FIG. 1).

Figure 3:
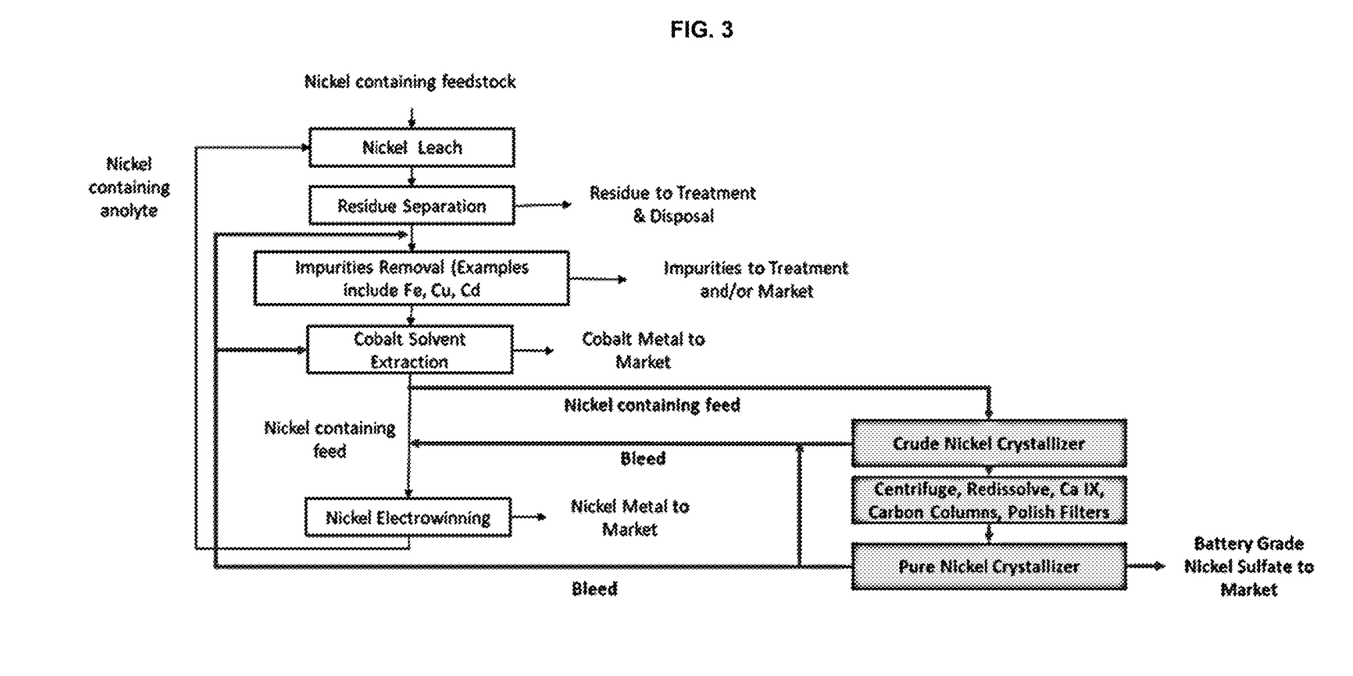
FIG. 3 is a schematic diagram of the process of Example 1 in accordance with an embodiment of the present disclosure.

A particular embodiment of the production of battery grade nickel sulfate from a Ni EW feed is shown in FIG. 3. In the Ni EW process, a nickel-containing feedstock is processed through the following steps: nickel leach; residue separation; impurities removal; cobalt solvent extraction; and nickel electrowinning. The nickel-containing anolyte from nickel electrowinning may then be returned upstream, for example, to the nickel leach step. As shown in FIG. 3, the nickel-containing feed to the Ni EW can be diverted, in part, to a crude nickel crystallizer. In this example, 10-20% w/w of the total Ni EW feed was diverted to the first (crude) nickel crystallizer, and the nickel content of the feed was 80-90 g/L. The concentration of boric acid in the first (crude) nickel crystallizer was 6-40 g/L of feed. The conditions for the first (crude) and second (pure) nickel crystallizer were 10-15° C. at a pH of 1-2. The nickel recovery of the process was 60-85% and 0.4-0.5 $m^3$ of water was removed per $m^3$ of feed.

The increase in boric acid concentration was found to be beneficial in increasing the nickel yield. Boric acid concentration can be increased in the crystallization process without impacting boric acid concentration in Ni EW. Without wishing to be bound by any particular theory, the increase in boric acid is believed to increase nickel yield by suppressing sodium from crystallizing in the first (crude) crystallizer.

The mother liquor from the first (crude) and/or second (pure) crystallization step, which may also be referred to as the bleed stream from the first (crude) and/or second (pure) crystallizer, can be returned to the nickel electrowinning plant. For example, as shown in FIG. 3, the bleed stream is returned to the nickel-containing feed to Ni EW, the feed to impurities removal, and/or the cobalt solvent extraction step.

Figure 5:
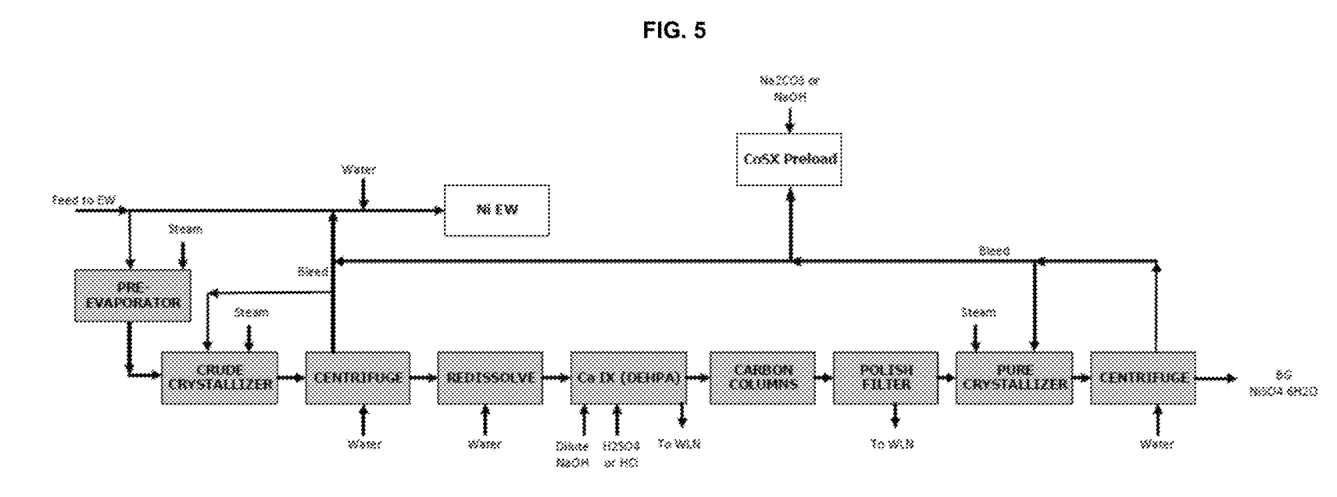
FIG. 5 is a schematic diagram of a crystallization process integrated with a nickel electrowinning plant in accordance with an embodiment of the present disclosure.

FIG. 5 shows an embodiment of a crystallization process integrated with a nickel electrowinning plant, such as that of FIG. 3. In this embodiment, crystallizing contains the following steps: pre-evaporation; crude crystallization; centrifugation; redissolution; calcium ion exchange; purification by carbon columns; polish filtering; a second (pure) crystallization; and a second centrifugation. One advantage to such a process is that some portion of water from the Ni-containing feed will be removed during crystallization and will not be fed back to the process. In particular, water is evaporated during crystallization.

Example 2

Treating a Ni-Containing Anolyte from Ni EW

Figure 2:
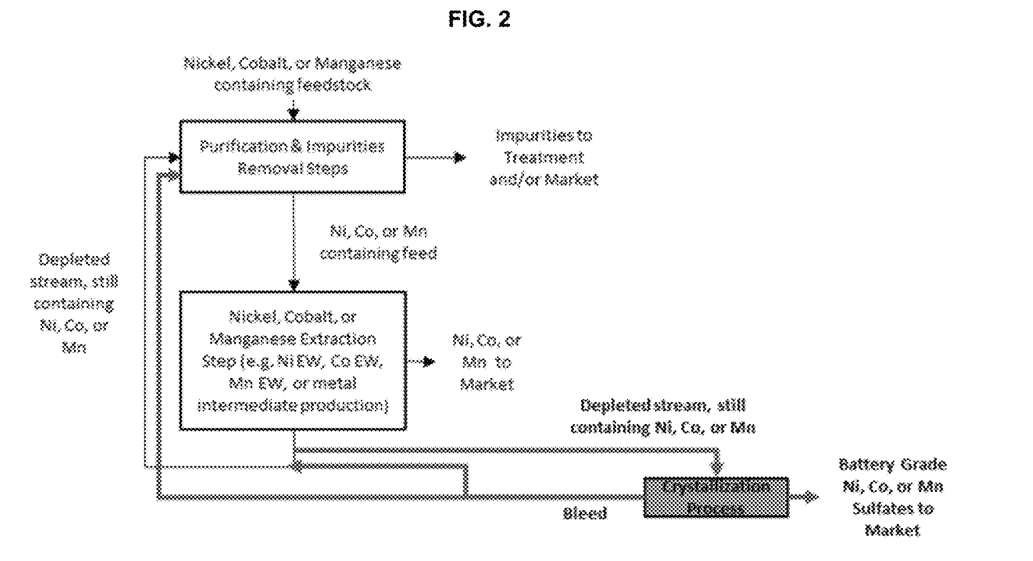
FIG. 2 is a schematic diagram of a process for producing metal sulfates according to another embodiment of the present disclosure, where the process comprises receiving a stream of a metal electrowinning process or metal intermediate production process.

For a nickel electrowinning (Ni EW) process that produces nickel metal, a portion of the Ni-containing anolyte from Ni EW can be treated using crystallization (along with other purification/impurity removal steps) to produce battery grade nickel sulfate (see FIG. 2).

Figure 4:
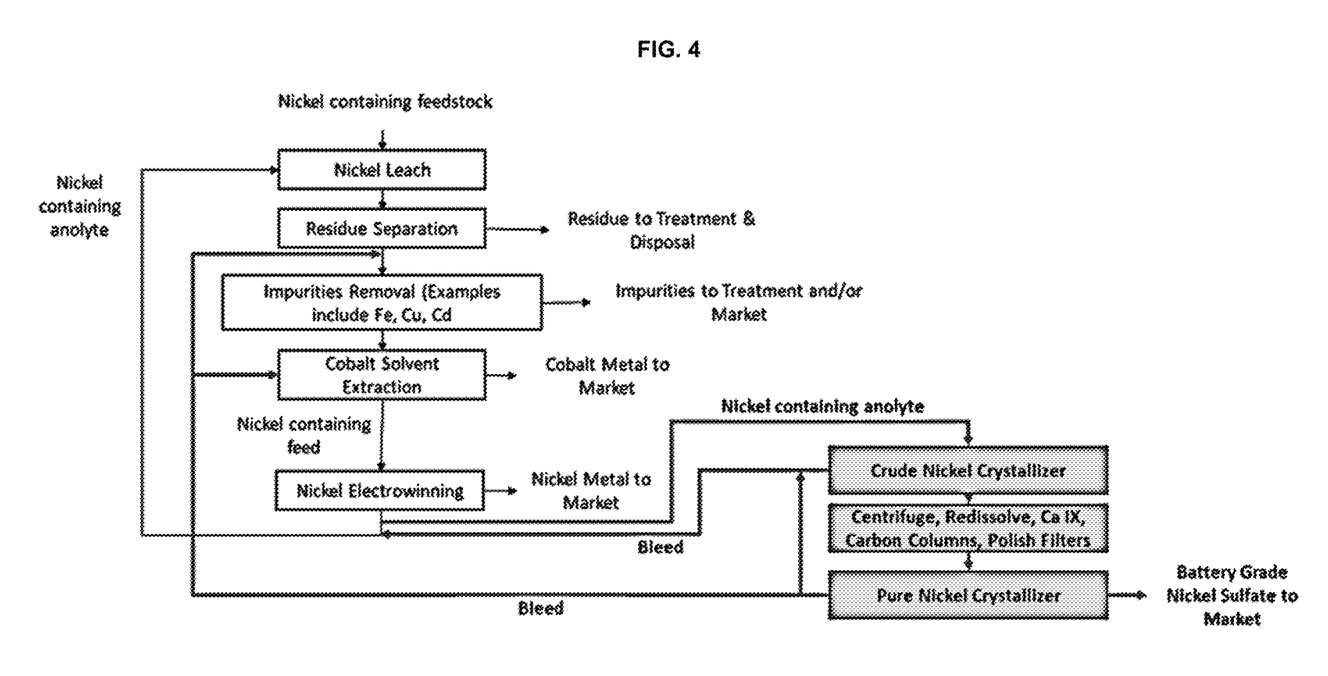
FIG. 4 is a schematic diagram of the process of Example 2 in accordance with an embodiment of the present disclosure.

A particular embodiment of the production of battery grade nickel sulfate from Ni EW anolyte is shown in FIG. 4. In this process, a nickel-containing feedstock is processed through the following steps: nickel leach; residue separation; impurities removal; cobalt solvent extraction; and nickel electrowinning. The nickel-containing anolyte from Ni EW may then be returned upstream, for example, to the nickel leach step. As shown in FIG. 4, the nickel-containing anolyte from the Ni EW step can be diverted, in part, to a crude nickel crystallizer. In this example, 30-40% w/w of the total anolyte was diverted to the first (crude) nickel crystallizer, and the nickel content of the anolyte stream was 40-50 g/L. The conditions for the first (crude) crystallizer were 20-30° C., and 10-15° C. for the second (pure) nickel crystallizer. The bleed acidity of the first (crude) crystallizer was 300-500 g sulfuric acid/L. The nickel recovery of the process was 60-85% and 0.4-0.5 m$^3$ of water was removed per m$^3$ of anolyte.

The acidity of the anolyte was found to suppress sodium from crystallizing in the first (crude) crystallizer. Without wishing to be bound by any particular theory, it is noted that the solubility of sodium sulfate increases with sulfuric acid concentration (to a certain point, around 1.7 m$H_2SO_4$), whereas the solubility of nickel sulfate decreases with increased sulfuric acid. For example, the solubility of sodium sulfate in (saturated) aqueous solution at 25° C. is about 1.5 mol/kg, which increases to about 2 mol/kg with 0.75 mol/kg $H_2SO_4$, and about 2.5 mol/kg with 1.7 mol/kg $H_2SO_4$. Above 1.7 mol/kg of $H_2SO_4$ the solubility of sodium sulfate is less (e.g. less than 1 mol/kg with 6-10 mol/kg $H_2SO_4$, with a minimum of <0.1 mol/kg at about 8 mol/kg $H_2SO_4$). The solubility of nickel sulfate in aqueous solution at 25° C. is about 2.5 mol/kg, which decreases to about 2.2 mol/kg in 1 mol/kg $H_2SO_4$, 1.8 mol/kg in 2 mol/kg $H_2SO_4$, 1.5 mol/kg in 3 mol/kg $H_2SO_4$, and about 1 mol/kg above 4 mol/kg $H_2SO_4$.

The mother liquor from the first (crude) and/or second (pure) crystallization step, which may also be referred to as the bleed stream from the first (crude) and/or second (pure) crystallizer, can be returned to the Ni EW plant. For example, as shown in FIG. 4, the bleed stream is returned to the nickel-containing anolyte stream from nickel electrowinning, the feed to impurities removal, and/or the cobalt solvent extraction step.

Figure 6:
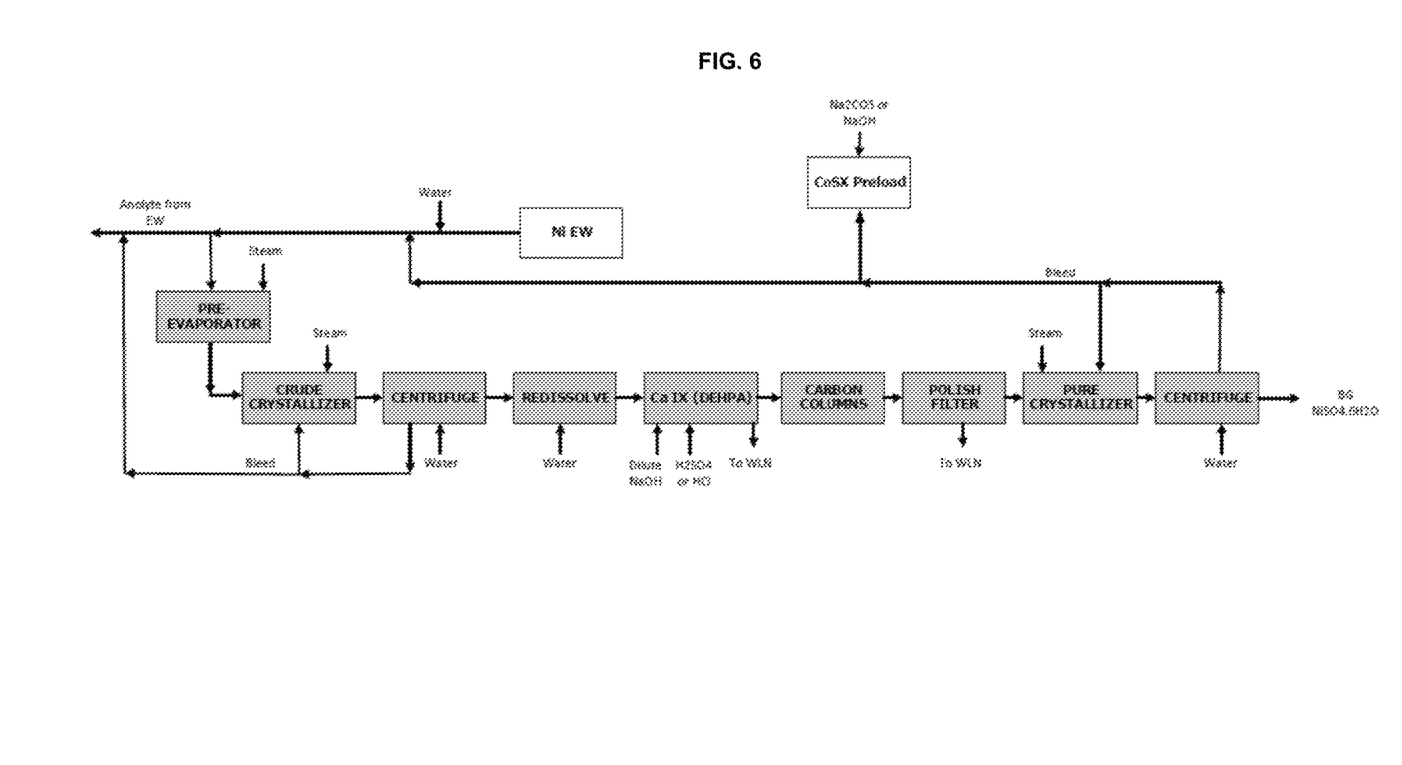
FIG. 6 is a schematic diagram of a crystallization process integrated with a nickel electrowinning plant in accordance with an embodiment of the present disclosure.

FIG. 6 shows an embodiment of a crystallization process integrated with the nickel electrowinning plant, such as that of FIG. 4, for crystallizing nickel sulfate from the Ni EW anolyte. In this embodiment, crystallizing contains the following steps: pre-evaporation; crude crystallization; centrifugation; redissolution; calcium ion exchange; purification by carbon columns; polish filtering; a second (pure) crystallization; and a second centrifugation. One advantage to such a process is that some portion of water from the anolyte will be removed during crystallization and will not be fed back to the process. In particular, water is evaporated during crystallization.

The embodiments described herein are intended to be examples only. Alterations, modifications and variations can be effected to the particular embodiments by those of skill in the art. The scope of the claims should not be limited by the particular embodiments set forth herein, but should be construed in a manner consistent with the specification as a whole.

All publications, patents and patent applications mentioned in this Specification are indicative of the level of skill those skilled in the art to which this invention pertains and are herein incorporated by reference to the same extent as if each individual publication patent, or patent application was specifically and individually indicated to be incorporated by reference.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A process for crystallizing a metal sulfate, the process comprising:
   diverting at least a portion of a fluid stream from a process performed in a metal processing plant to a crystallizer separate from the process performed in the metal processing plant,
   the stream comprising a metal sulfate and an impurity;
   controlling operational parameters of the crystallizer to crystalize the metal sulfate over the impurity, and
   crystallizing the metal sulfate to form a crystallized metal sulfate in a mother liquor, the mother liquor comprising the impurity;
   separating the crystallized metal sulfate from the mother liquor; and
   returning the mother liquor upstream in the process or returning the mother liquor to the metal processing plant;
   wherein the fluid stream is a feed to a metal electrowinning, metal hydrogen reduction, metal intermediate production, or metal oxide production step of the plant.

2. The process according to claim 1, wherein the fluid stream is a feed to metal electrowinning and boric acid is present in the fluid stream or is added to the fluid stream to suppress crystallization of sodium salts.

3. The process according to claim 2, wherein boric acid is added only to the portion of the fluid stream that is received for crystallization.

4. The process according to claim 1, wherein crystallizing the metal sulfate comprises a first crystallization step and a second crystallization step, and the crystallized metal sulfate from the first crystallization step is redissolved and recrystallized in the second crystallization step.

5. The process according to claim 4, wherein a mother liquor from the second crystallization step is returned to either the first crystallization step or another step of the plant or process.

6. The process of claim 1, wherein the mother liquor is acidic.

7. The process of claim 6, wherein returning the mother liquor to the plant comprises using the mother liquor upstream in the plant as a leaching agent.

8. The process of claim 1, wherein the process comprises:
receiving a portion of the fluid stream from the metal processing plant; or
returning the mother liquor to the plant.

9. The process of claim 1, further comprising:
refining the fluid stream prior to crystallizing; or
basifying the mother liquor.

10. The process according to claim 1, wherein the mother liquor is returned upstream of the metal electrowinning, metal hydrogen reduction, metal intermediate production, or metal oxide production step of the plant, or
wherein the fluid stream is an anolyte from a metal electrowinning step of the plant, and the mother liquor is returned downstream of the metal electrowinning step of the plant.

11. The process according to claim 1, wherein the fluid stream comprises nickel, cobalt, or manganese ions.

12. The process according to claim 1, wherein the crystallized metal sulfate is a hydrated salt or is battery grade nickel sulfate.

13. The process according to claim 1, wherein the mother liquor is a bleed stream used to preload an organic extractant in a solvent extraction step of the plant, with the metal sulfate to be recovered, to reduce a sodium, ammonium, or other impurity cation concentration in the stream in which the mother liquor is returned.

14. The process of claim 1, wherein diverting at least a portion of the fluid stream from a process performed in a metal processing plant comprises diverting a fluid sidestream from the metal processing plant.

15. The process of claim 1, wherein the process is integrated with a metal processing plant.

16. The process of claim 1, wherein controlling operational parameters of the crystallizer to crystalize a metal sulfate over an impurity comprises:
bleeding the mother liquor from the crystallizer; and
controlling the bleed rate from the crystallizer to inhibit crystallizing the impurity when crystallizing the metal sulfate, or
controlling the bleed rate from the crystallizer to crystallize one metal sulfate over another metal sulfate.

17. The process of claim 1, wherein the impurity comprises sodium, calcium, magnesium, potassium, fluoride, copper, iron, aluminum, zinc, and/or borates.

18. The process of claim 1, wherein the plant is one or more of a metal electrowinning plant, a metal hydrogen reduction plant, a metal intermediate production plant, or a metal oxide production plant.

19. A process for crystallizing a metal sulfate, the process comprising:
diverting at least a portion of a fluid stream from a process performed in a metal processing plant to a crystallizer separate from the process performed in the metal processing plant,
the stream comprising a metal sulfate and an impurity;
controlling operational parameters of the crystallizer to crystalize the metal sulfate over the impurity, and
crystallizing the metal sulfate to form a crystallized metal sulfate in a mother liquor, the mother liquor comprising the impurity;
separating the crystallized metal sulfate from the mother liquor; and
returning the mother liquor upstream in the process or returning the mother liquor to the metal processing plant;
wherein the fluid stream is an anolyte from a metal electrowinning step of the plant.

20. The process according to claim 19, wherein crystallizing the metal sulfate comprises a first crystallization step and a second crystallization step, and the crystallized metal sulfate from the first crystallization step is redissolved and recrystallized in the second crystallization step.

21. The process according to claim 20, wherein a mother liquor from the second crystallization step is returned to either the first crystallization step or another step of the plant or process.

22. The process of claim 19, wherein the mother liquor is acidic.

23. The process of claim 22, wherein returning the mother liquor to the plant comprises using the mother liquor upstream in the plant as a leaching agent.

24. The process of claim 19, wherein the process comprises:
receiving a portion of the fluid stream from the metal processing plant; or
returning the mother liquor to the plant.

25. The process of claim 19, further comprising:
refining the fluid stream prior to crystallizing; or
basifying the mother liquor.

26. The process according to claim 19, wherein the fluid stream comprises nickel, cobalt, or manganese ions.

27. The process according to claim 19, wherein the crystallized metal sulfate is a hydrated salt or is battery grade nickel sulfate.

28. The process according to claim 19, wherein the mother liquor is a bleed stream used to preload an organic extractant in a solvent extraction step of the plant, with the metal sulfate to be recovered, to reduce a sodium, ammonium, or other impurity cation concentration in the stream in which the mother liquor is returned.

29. The process of claim 19, wherein diverting at least a portion of the fluid stream from a process performed in a metal processing plant comprises diverting a fluid sidestream from the metal processing plant.

30. The process of claim 19, wherein the process is integrated with a metal processing plant.

31. The process of claim 19, wherein controlling operational parameters of the crystallizer to crystalize a metal sulfate over an impurity comprises:
bleeding the mother liquor from the crystallizer; and
controlling the bleed rate from the crystallizer to inhibit crystallizing the impurity when crystallizing the metal sulfate, or
controlling the bleed rate from the crystallizer to crystallize one metal sulfate over another metal sulfate.

32. The process of claim 19, wherein the impurity comprises sodium, calcium, magnesium, potassium, fluoride, copper, iron, aluminum, zinc, and/or borates.

33. The process of claim 19, wherein the plant is one or more of a metal electrowinning plant, a metal hydrogen reduction plant, a metal intermediate production plant, or a metal oxide production plant.

\* \* \* \* \*